(12) United States Patent
Musalay et al.

(10) Patent No.: US 11,334,430 B2
(45) Date of Patent: May 17, 2022

(54) VIRTUAL DISK FILE RESILIENCY FOR CONTENT BASED READ CACHE (CBRC) ENABLED ENVIRONMENT

(71) Applicant: VMWARE, INC., Palo Alto, CA (US)

(72) Inventors: Goresh Musalay, Bangalore (IN); Kashish Bhatia, Bangalore (IN); Zubraj Singha, Bangalore (IN); Tanay Ganguly, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/991,164

(22) Filed: Aug. 12, 2020

(65) Prior Publication Data

US 2021/0373994 A1 Dec. 2, 2021

(30) Foreign Application Priority Data

May 29, 2020 (IN) .............................. 202041022671

(51) Int. Cl.
| | |
|---|---|
| *G06F 11/00* | (2006.01) |
| *G06F 11/10* | (2006.01) |
| *G06F 11/07* | (2006.01) |
| *G06F 9/30* | (2018.01) |
| *G06F 11/30* | (2006.01) |

(52) U.S. Cl.
CPC ........ *G06F 11/1068* (2013.01); *G06F 9/3009* (2013.01); *G06F 11/073* (2013.01); *G06F 11/076* (2013.01); *G06F 11/0787* (2013.01); *G06F 11/301* (2013.01); *G06F 11/3037* (2013.01)

(58) Field of Classification Search
CPC .. G06F 11/1068; G06F 11/073; G06F 11/076; G06F 11/0787; G06F 11/301; G06F 11/3037; G06F 11/0712; G06F 11/0727; G06F 11/1004; G06F 11/1064; G06F 9/3009

See application file for complete search history.

(56) References Cited

U.S. PATENT DOCUMENTS

| | | | |
|---|---|---|---|
| 10,949,289 B1 * | 3/2021 | Monakhov | .......... G06F 11/1004 |
| 2011/0265083 A1 * | 10/2011 | Davis | .................. G06F 12/0866 718/1 |
| 2016/0259693 A1 * | 9/2016 | Sundararaman | .... G06F 11/1458 |
| 2018/0314542 A1 * | 11/2018 | Karkun | ................. G06F 16/172 |

* cited by examiner

*Primary Examiner* — Joseph D Manoskey
(74) *Attorney, Agent, or Firm* — Patterson + Sheridan, LLP (57) ABSTRACT

Disclosed herein is a system and method for checking and maintaining consistency of blocks stored in a virtual disk with a content based read cache (CBRC). When blocks are written to the cache and virtual disk, a hash is computed for the block and stored in a digest file on the virtual disk. In the background, each block is obtained from the virtual disk, its hash is recomputed, and the hash is compared to the stored hash in the digest file. If the comparison indicates a mismatch, then an error is reported.

15 Claims, 7 Drawing Sheets

VIRTUAL DISK FILE RESILIENCY FOR CONTENT BASED READ CACHE (CBRC) ENABLED ENVIRONMENT

RELATED APPLICATIONS

Benefit is claimed under 35 U.S.C. 119(a)-(d) to Foreign Application Serial No. 202041022671 filed in India entitled "VIRTUAL DISK FILE RESILIENCY FOR CONTENT BASED READ CACHE (CBRC) ENABLED ENVIRONMENT", on May 29, 2020, by VMware, Inc., which is herein incorporated in its entirety by reference for all purposes.

BACKGROUND

Content Based Read Caches (CBRCs) can be used by virtual computing instances (VCIs) such as virtual machines (VMs) to get better performance by caching frequently-accessed data in a reserved memory region of a host computer system. If a VM enables the CBRC in its configuration, a VM manager reserves a space in the host computer system's memory for the CBRC to cache read data for that VM running on the host computer system. Every host computer system has its own CBRC cache available for all VMs residing on that host computer system.

Each CBRC-enabled VM has better performance if applications running inside VMs are the same because similar I/O requests are cached in the CBRC, and all of the VMs can make use of the cached data. In addition, with all of the VMs running the same application, it may take several days before the CBRC becomes completely filled with unique data.

When data is written to the CBRC, it is also written to a virtual disk that backs the CBRC. It is important that the data on the virtual disk is correct, i.e., not corrupted, but checking all of the data blocks on the virtual disk is a time-consuming process that would burden the virtual disk write operations. A technique is needed to check the blocks on the virtual disk without burdening the write operations.

SUMMARY

Embodiments include a method for checking blocks in a virtual disk. The method includes, upon a write of a first block to the virtual disk, where the virtual disk contains a plurality of blocks, updating data of the first block in a content-based read cache (CBRC) and data of the first block on the virtual disk. The method further includes, after updating the data of the first block on the virtual disk, updating a bitmap by setting a first bit corresponding to the first block in the bitmap, where the bitmap contains a corresponding bit for each block of the virtual disk. The method further includes, after updating the bitmap, computing a first hash of the first block, storing the first hash to a digest file stored on the virtual disk, and resetting the first bit corresponding to the first block after the first hash is stored to the digest file. The method further includes, for any bit that is not set in the bitmap: computing a hash of the corresponding block of the virtual disk corresponding to the bit that is not set, comparing the computed hash to a corresponding stored hash for the corresponding block in the digest file, and if the computed hash and the stored hash are not equal, reporting an error.

Further embodiments include a computer-readable medium containing instructions for carrying out one more aspects of the above method, and a system configured to carry out one or more aspects of the above method.

DETAILED DESCRIPTION

Embodiments of system and methods are described herein for checking for data corruption of a virtual machine's virtual disk (e.g., VMDK file), for virtual machines having an enabled CBRC. When blocks are newly written to the CBRC and the virtual disk, a bit is set in a bitmap, which has a bit for each block on the disk, indicating that the block is newly written. Concurrently with execution of the write operation, an independent thread, called a digest thread, operates to detect bits that are set in the bitmap, to apply a hash function to the contents of a block corresponding to one of the set bits, to generate a hash value, and to store the hash value on the virtual disk. Using an independent thread avoids placing the burden of the hash generation during the write operation, thereby speeding up the write operation. The hash function, which is a mapping of block contents to a hash value, is designed such that blocks with different contents have different hash values, making the hash function well-suited to detecting data corruption of a block of data on the virtual disk. To detect any such data corruption of blocks, another independent thread, called a consistency thread, is created and runs concurrently with the write operation and the digest thread. The consistency thread examines the bitmap for any bit indicating that a hash for the block has been stored by the digest thread, and reads the block from the virtual disk corresponding to the bit. The consistency thread then generates a hash value for the block that was read and compares the newly generated hash value with the stored hash value. If there is a difference in hash values, then the block has been corrupted, and an error is reported. Because both the digest thread and the consistency thread operate concurrently to access the same bitmap, the threads need to cooperate with each other. Cooperation is achieved by setting a high limit number and a low limit number on the number of bits set in the bitmap. The high limit number and low limit number determine whether the digest thread or consistency thread runs and its duration.

Figure 1:
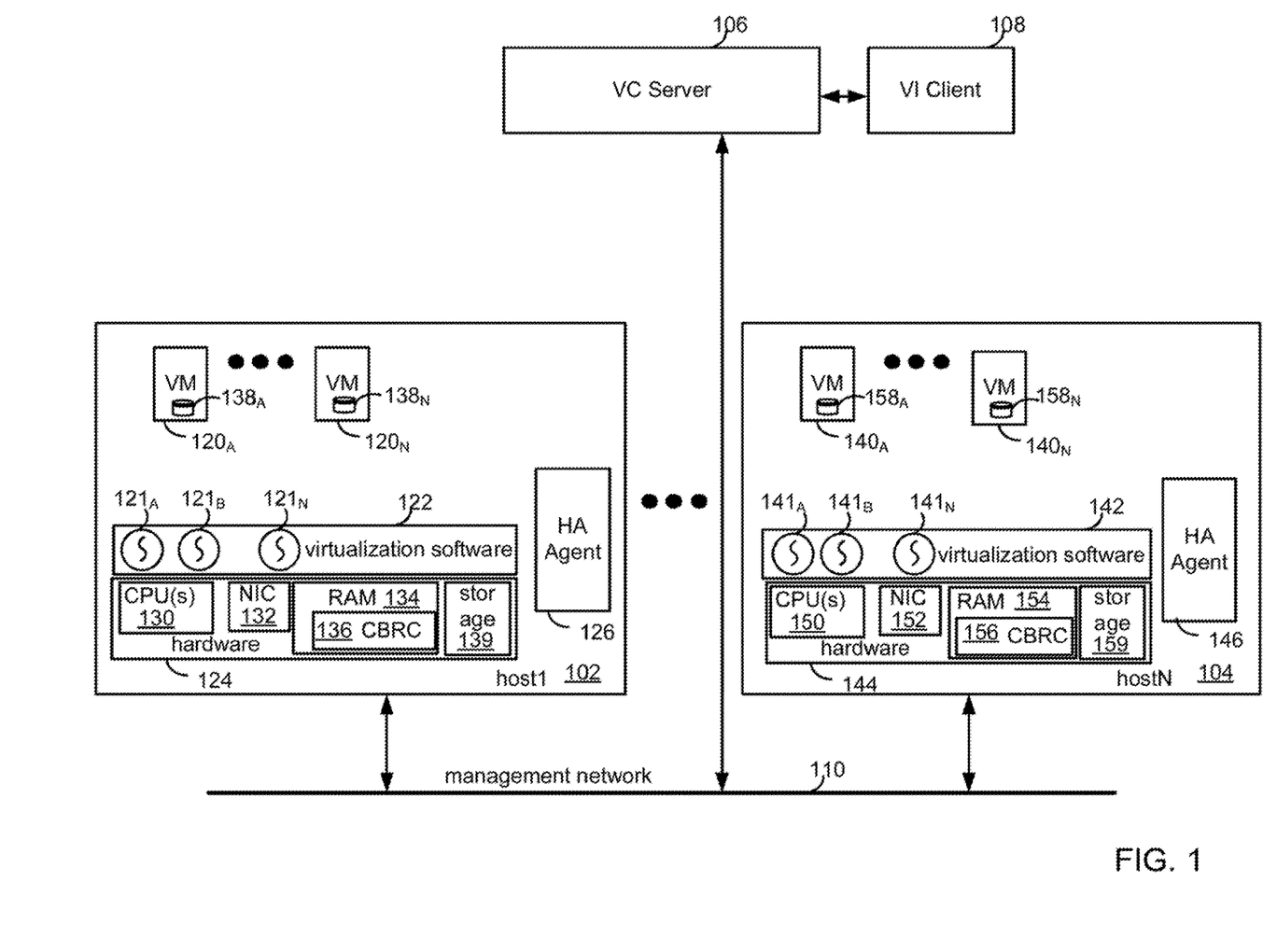
FIG. 1 depicts a block diagram of a computer system that is representative of a computer architecture in which embodiments may be implemented.

FIG. 1 depicts a block diagram of a computer system that is representative of a computer architecture in which embodiments may be implemented. The figure depicts a cluster of host computer systems 102 (e.g., first host computer), 104 (e.g., second host computer), which are connected to a management network 110. Also depicted is a Virtual Center (VC) server 106 connected to management network 110 and to a Virtual Infrastructure (VI) client 108.

Host computer system 102 in the cluster includes hardware 124, virtualization software 122, a high availability (HA) agent 126, and one or more virtualized computing instances such as virtual machines (VMs) $120_{A-N}$. Each virtual machine (VM) $120_{A-N}$ has at least one virtual disk $138_{A-N}$, which is backed by a file in persistent physical storage 139.

Hardware 124 in host computer system 102 includes one or more CPUs 130, a network interface controller (NIC) 132 and RAM 134. NIC 132 allows VMs $120_{A-N}$ to communicate with management network 110. RAM 134 contains a CBRC 136 (e.g., first CBRC) in a reserved memory space of RAM 134. CBRC 136 is a cache for VMs $120_{A-N}$ and stores frequently accessed blocks for VMs $120_{A-N}$ on host computer systems 102.

Virtualization software 122 includes one or more threads $121_{A-N}$ for use in consistency checking, as described below.

Host computer system 104 in the cluster includes hardware 144, virtualization software 142, a high availability (HA) agent 146, and one or more virtual machines $140_{A-N}$. Each virtual machine (VM) $140_{A-N}$ has at least one virtual disk $158_{A-N}$, which is backed by a file in persistent physical storage 159.

Hardware 144 in host computer system 104 includes one or more CPUs 150, a network interface controller (NIC) 152, and RAM 154. NIC 152 allows VMs $140_{A-N}$ to communicate with management network 110, RAM 154 contains a CBRC 156 (e.g., second CBRC) in a reserved memory space of RAM 154. CBRC 156 is a cache for VMs $140_{A-N}$, and stores frequently accessed blocks for VMs $140_{A-N}$ on host computer system 104.

Virtualization software 142 includes one or more threads $141_{A-N}$ for use in consistency checking, as described below.

VC server 106 manages the cluster of host computer systems 102, 104. VC server 106 places HA agent 126, 146 in each host computer system 102, 104 of the cluster so that each host computer system 102, 104 can communicate with other host computer systems to maintain state information and knows how to proceed in the case of another host computer system's failure. In particular, one HA agent among the HA agents in the cluster is designated the master HA. The master HA, say HA agent 126, monitors signals from other host computer systems in the cluster and communicates with VC server 106. Each host computer system 102, 104 within the cluster communicates via a heartbeat, which is a periodic message that indicates a host computer system is running as expected. If the master HA fails to detect a heartbeat signal from another host computer system within the cluster, the master HA instructs VC server 106 to take corrective action. For example, if an entire host computer system fails, VC server 106 restarts all affected VMs on other host computer systems in the cluster.

The VI client 108 connects to VC server 106 to provide client access to VC server 106.

Figure 2:
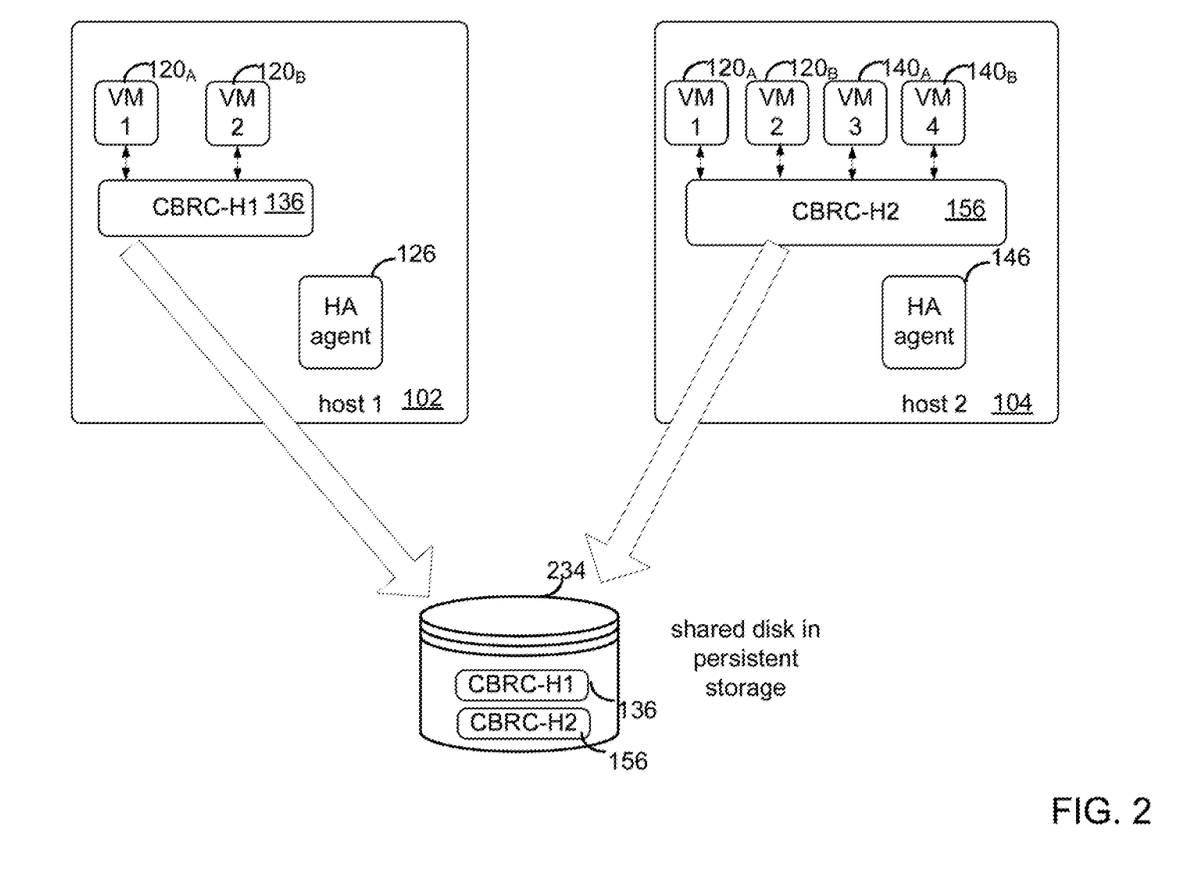
FIG. 2 depicts a first case of a failed host computer system.

FIG. 2 depicts a first case of a host computer system, which is the case in which CBRC 136 and CBRC 156 are both enabled. In the figure, host computer system 1 102 runs virtual machines 120A, 120B, and gives them access to CBRC 136. Host computer system 2 104 runs virtual machines 140A, 140B, and gives them access to a CBRC 156 on host computer system 2 104. Both CBRC 136 and CBRC 156 are backed up on shared disk 234. Shared disk 234 may be, for example, a storage area network (SAN), such as accessible via NIC 132 and NIC 152, a virtual SAN (vSAN), etc.

Figure 3:
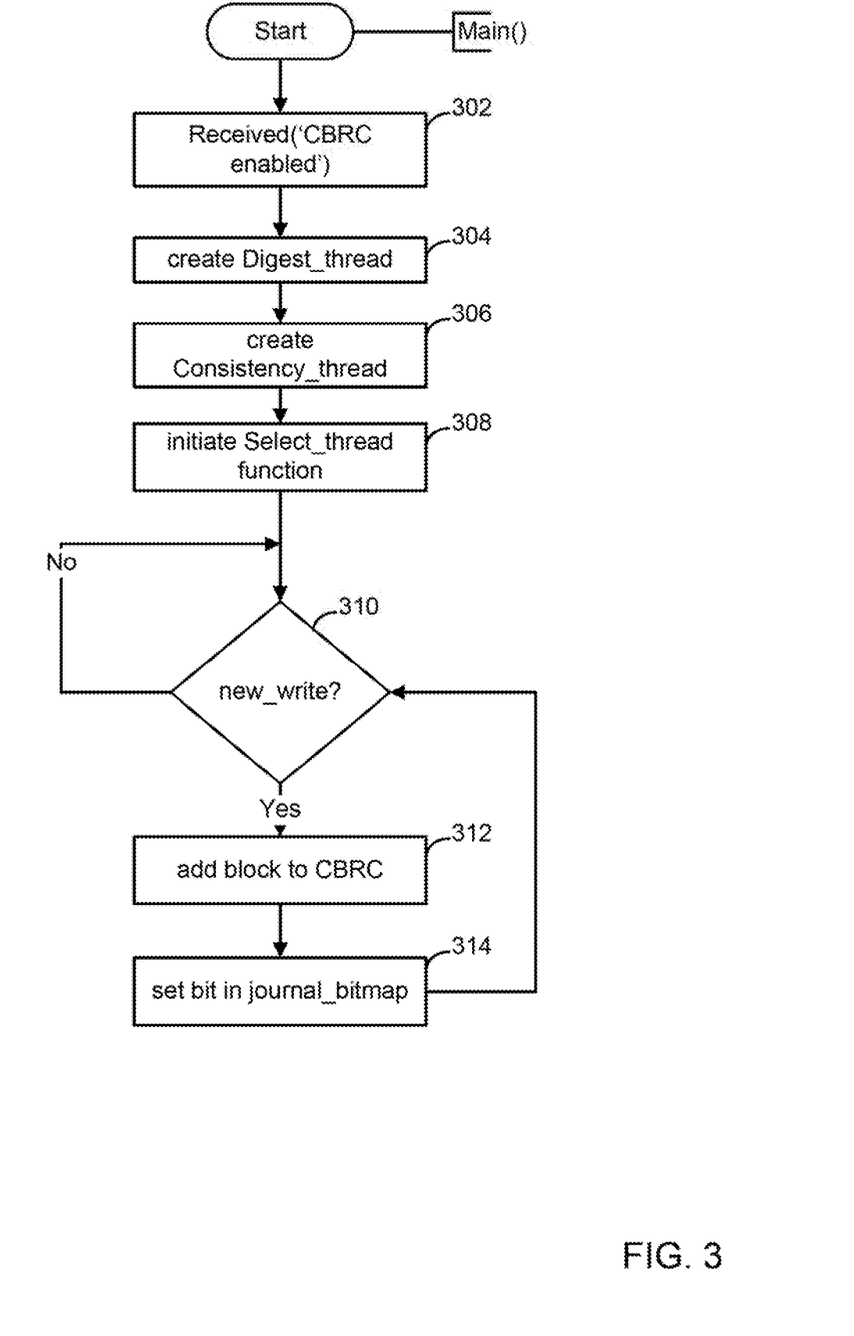
FIG. 3 depicts a flow of operations of a main thread, in an embodiment.

FIG. 3 depicts a flow of operations of a main thread, in an embodiment. In step 302, the main thread, one of threads $121_{A-N}$, $141_{A-N}$, receives notice that a CBRC is enabled. In step 304, the main thread creates the Digest_thread and, in step 306, creates the Consistency_thread, both of which are further described below. In step 308, the main thread initiates a Select_thread 400 function, described below. In step 310, the main thread awaits a new write operation. In step 312, if a new write operation occurs, the main thread adds a block to the CBRC and, in step 314, sets a bit corresponding to the block in a journal bitmap indicating that a new block is written. In one embodiment, the block has a size of 4 Kbytes.

The journal bitmap, which is stored on the virtual disk, has a bit for each block of the virtual disk and indicates that a block is newly written when a bit is set. Accordingly, when not set, the bit indicates the block is not newly written but that the hash of the block has been stored. Associated with the journal bitmap are a high_limit number and a low_limit number. The high_limit number indicates a large number of bits set in the journal bitmap, and the low_limit number indicates a small number of bits set in the journal map. As described below, the high_limit number controls whether or not the Digest_thread runs and the duration of the running of the Consistency_thread. The low_limit number controls whether or not the Consistency_thread runs and the duration of running of the Digest_thread.

Figure 4:
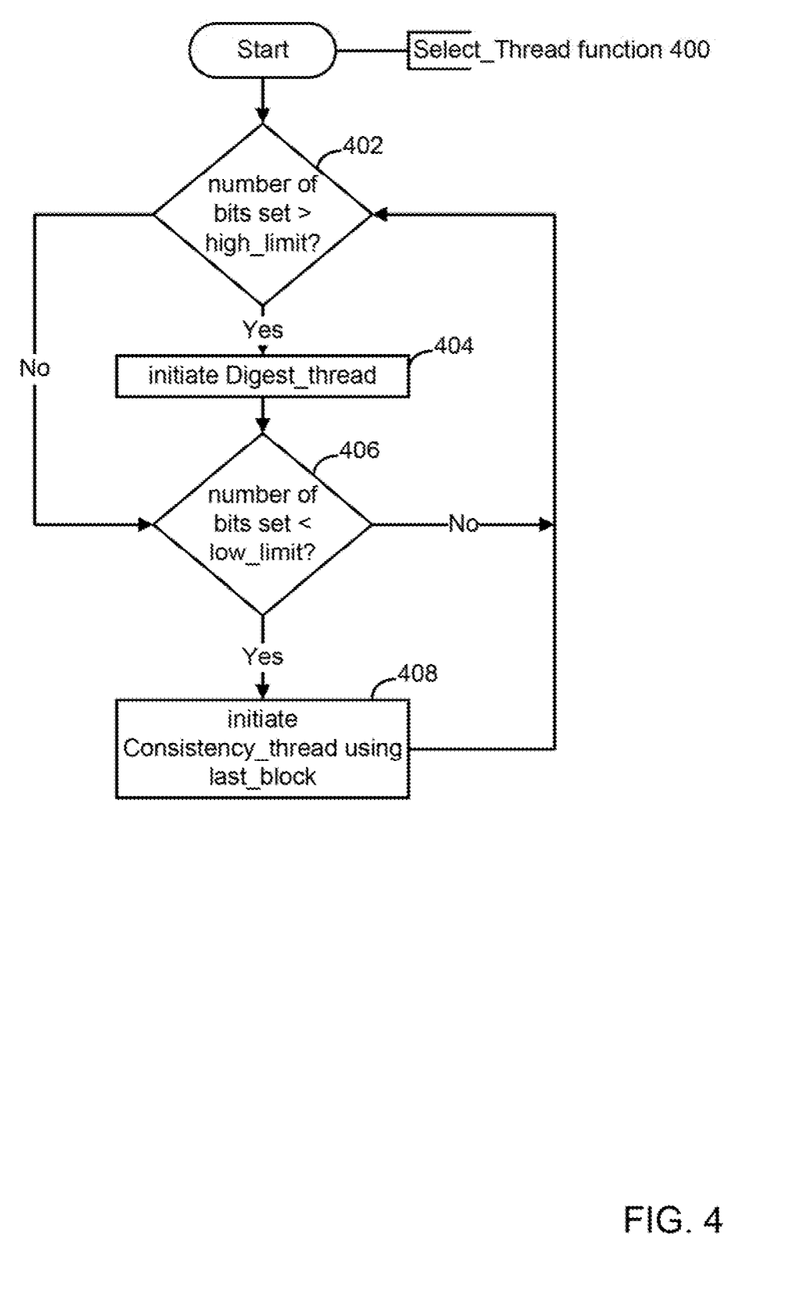
FIG. 4 depicts a flow of operations of the Select_thread function, in an embodiment.

FIG. 4 depicts a flow of operations of the Select_thread function, in an embodiment. The Select_thread 400 function decides whether to initiate the Digest_thread 500 or the Consistency_thread 600. In step 402, the Select_thread function compares the number of bits set in the journal bitmap to the high_limit number. If the number of bits set exceeds the high_limit number, then the Select_thread function initiates the Digest_thread in step 404. If the number of bits set does not exceed the high_limit number but is less than a low_limit number as determined in step 406, then the Select_thread function initiates the Consistency_thread in step 408.

Figure 5:
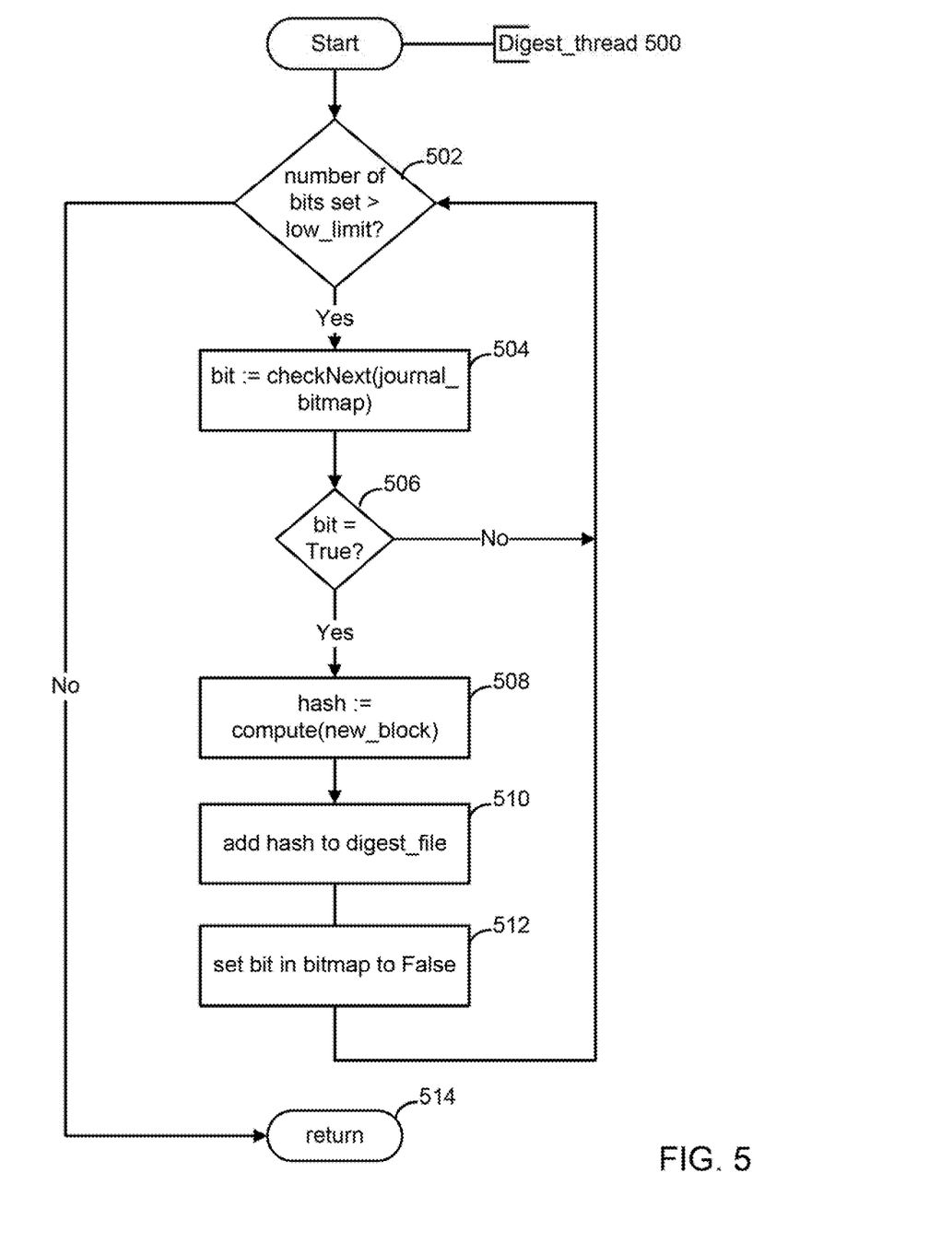
FIG. 5 depicts a flow of operations of the Digest_thread function, in an embodiment.

FIG. 5 depicts a flow of operations of the Digest_thread function, in an embodiment. In step 502, the independently running Digest_thread function tests whether the number of bits set is greater than the low_limit number, where the Digest_thread 500 is one of threads $121_{A-N}$, $141_{A-N}$. If so, then in step 504, the function obtains the next bit from the bitmap and tests, in step 506, whether the bit is True (i.e., set). If so, then in step 508, the function computes the hash of the block corresponding to the bit that was set. In step 510, the function adds the computed hash to the digest file on the virtual disk, and in step 512 resets the bit in the bitmap (i.e., sets the bit to False). The function continues to perform steps 502-512 until the number of bits does not exceed the low_limit number, at which point the function returns in step 514.

Figure 6:
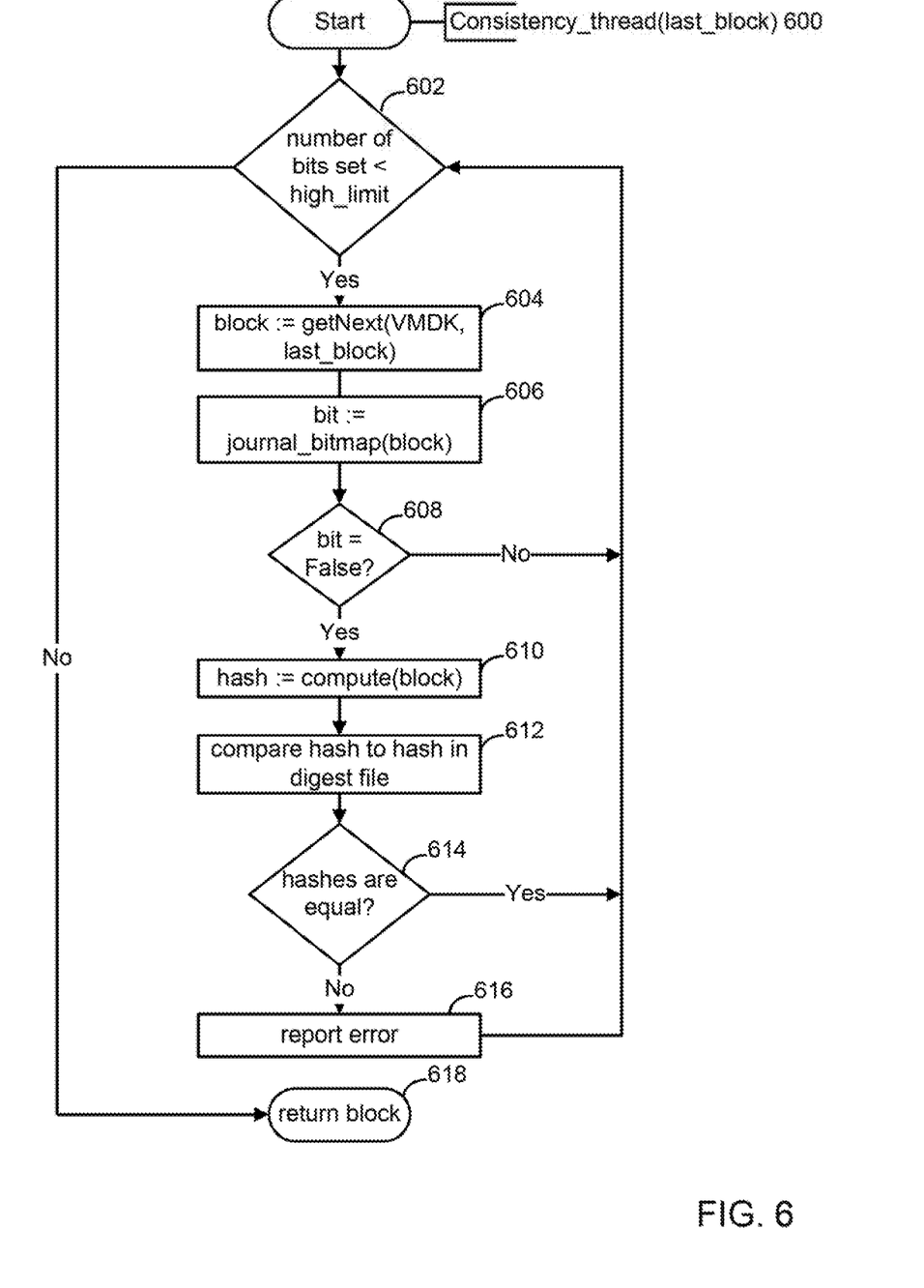
FIG. 6 depicts a flow of operations of the Consistency_thread function.

FIG. 6 depicts a flow of operations of the Consistency_thread function. In step 602, the function tests whether the number of bits set is less than the upper_limit number, where the Consistency_thread 600 is one of threads $121_{A-N}$, $141_{A-N}$. If so, then in step 604, the function gets the next block from the virtual disk, picking up from the last block that was processed (which initially is the first block on the disk). In step 606, the function gets the bit corresponding to the block from the bitmap, and in step 608 determines whether the bit is set. If the bit is not set (i.e., is False), then the function computes the hash for the block in step 610, and in step 612 compares the just-computed hash with the hash stored in the digest file. If the hashes are equal, as determined in step 614, then the function goes back to step 602 as there is no error. If the hashes are not equal, then the function reports an error in step 616 and goes back to step 602. The function continues to perform steps 602-614 and possibly step 616 (if there is an error) until the number of bits set is greater than or equal to the upper_limit number, at which point the function returns in step 618 with the last block that was processed. Thus, the Consistency_thread 600 runs until the number of bits sets equals or exceeds the upper_limit number, at which point the Digest_thread 500 is called to compute and store the hashes of the newly written blocks.

Figure 7:
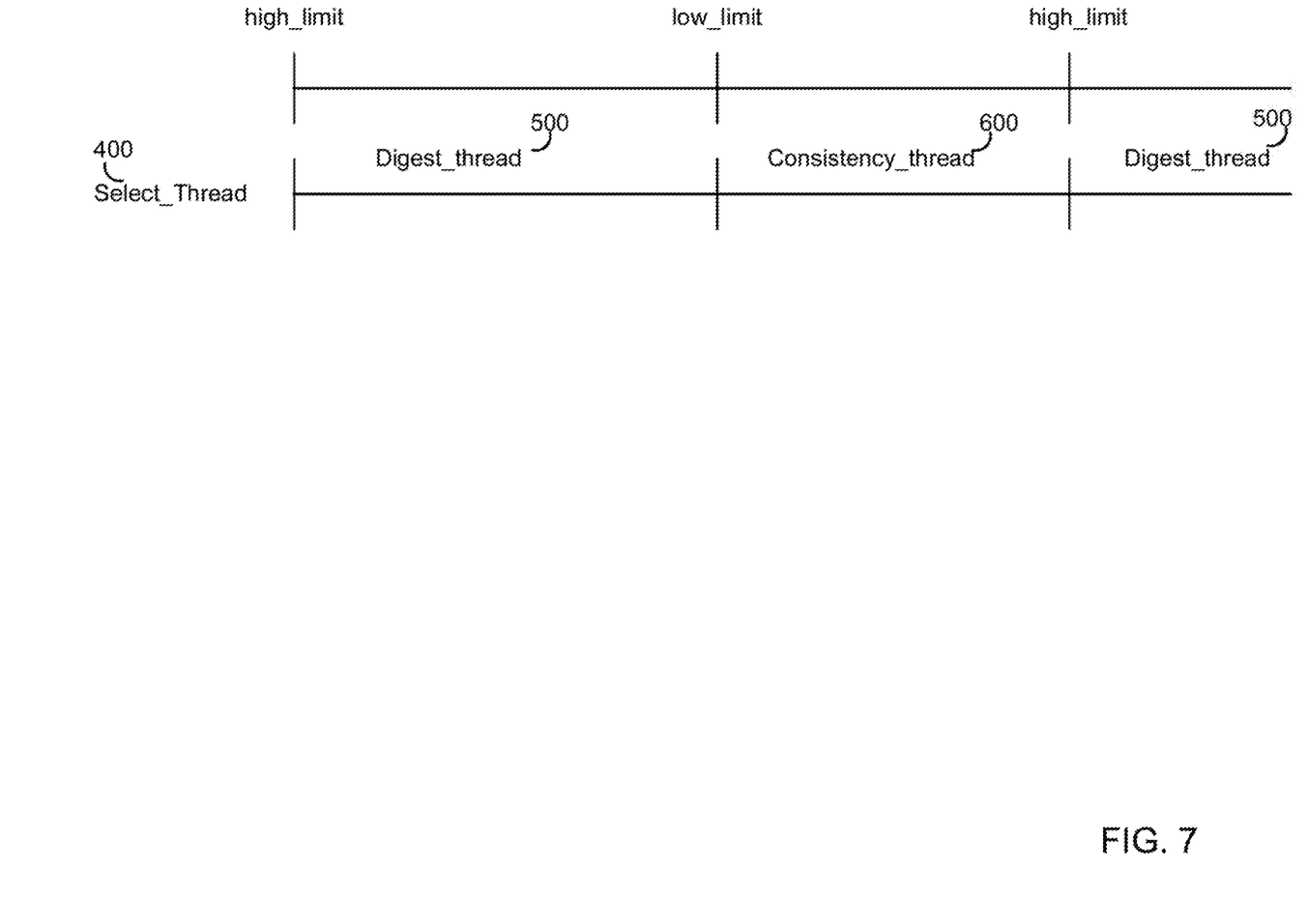
FIG. 7 depicts timelines for the Select_thread function.

FIG. 7 depicts timelines for the Select_thread function. In the diagram, if the number of bits set is greater than the high_limit number, then the Digest_thread 500 runs. If the number of bits set is less than the low_limit number, then the Consistency_thread 600 runs.

Thus, the Consistency_thread performs checks on the blocks of the virtual disk but cooperates with the Digest_thread which runs to compute hashes for newly written blocks. Cooperation is achieved by setting a low_limit and a high_limit on the number of bits set in the bit map and having the Digest_thread run when the number of bits set exceeds the high_limit number and stop when the number of bits set is equal to or less than the low_limit number, while the Consistency_thread runs when the number of bits set is less than the low_limit number and stops when the number of its is equal to or greater than the high_limit number. The high_limit and low_limit numbers effectively cause the Digest_thread and Consistency_thread to alternate their active times, as depicted in FIG. 7. In addition, if while the Consistency_thread is running, the number of bits set exceeds the high_limit number, the Digest_thread will effectively preempt the Consistency_thread and start running.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for checking blocks in a virtual disk, the method comprising:
    upon a write of a first block to the virtual disk, the virtual disk containing a plurality of blocks, updating data of the first block in a content-based read cache (CBRC) and data of the first block on the virtual disk;
    after updating the data of the first block on the virtual disk, updating a bitmap by setting a first bit corresponding to the first block in the bitmap, wherein the bitmap contains a bit for each block of the virtual disk, wherein updating the CBRC, updating the virtual disk, and updating the bitmap are performed by a first thread;
    after updating the bitmap, computing a first hash of the first block;
    storing the first hash to a digest file stored on the virtual disk;
    resetting the first bit after the first hash is stored to the digest file; and
    for any bit that is not set in the bitmap:
        computing a hash of a block of the virtual disk corresponding to the bit that is not set;
        comparing the computed hash to a stored hash for the block, the stored hash stored in the digest file; and
        if the computed hash and the stored hash are not equal, reporting an error, wherein comparing the computed hash to the stored hash and reporting the error are performed by a second thread.

2. The method of claim 1, wherein computing the first hash of the first block, storing the first hash to the digest file, and resetting the first bit are performed by a third thread.

3. The method of claim 2, wherein the second thread runs concurrently with the third thread.

4. The method of claim 2, wherein the third thread runs when a number of bits set in the bitmap exceeds a high limit number and continues while the number of bits set in the bitmap is greater than a low limit number.

5. The method of claim 1, wherein the second thread runs concurrently with the first thread.

6. The method of claim 1, wherein the second thread runs when a number of bits set in the bitmap is less than a low limit number and continues while the number of bits set in the bitmap is less than a high limit number.

7. A non-transitory computer-readable medium comprising instructions executable in a computer system, wherein the instructions when executed in the computer system cause the computer system to carry out operations for checking blocks in a virtual disk, the operations comprising:
    upon a write of a first block to the virtual disk, the virtual disk containing a plurality of blocks, updating data of the first block in a content-based read cache (CBRC) and data of the first block on the virtual disk;
    after updating the data of the first block on the virtual disk, updating a bitmap by setting a first bit corresponding to the first block in the bitmap, wherein the bitmap contains a bit for each block of the virtual disk, wherein updating the CBRC, updating the virtual disk, and updating the bitmap are performed by a first thread;
    after updating the bitmap, computing a first hash of the first block;
    storing the first hash to a digest file stored on the virtual disk;
    resetting the first bit after the first hash is stored to the digest file; and
    for any bit that is not set in the bitmap:
        computing a hash of a block of the virtual disk corresponding to the bit that is not set;
        comparing the computed hash to a stored hash for the block, the stored hash stored in the digest file; and
        if the computed hash and the stored hash are not equal, reporting an error, wherein comparing the computed hash to the stored hash and reporting the error are performed by a second thread.

8. The non-transitory computer-readable medium of claim 7, wherein computing the first hash of the first block, storing the first hash to the digest file, and resetting the first bit are performed by a third thread.

9. The non-transitory computer-readable medium of claim 8, wherein the second thread runs concurrently with the third thread.

10. The non-transitory computer-readable medium of claim 8, wherein the third thread runs when a number of bits set in the bitmap exceeds a high limit number and continues while the number of bits set in the bitmap is greater than a low limit number.

11. The non-transitory computer-readable medium of claim 7, wherein the second thread runs concurrently with the first thread.

12. The non-transitory computer-readable medium of claim 7, wherein the second thread runs when a number of bits set in the bitmap is less than a low limit number and continues while the number of bits set in the bitmap is less than a high limit number.

13. A system comprising:
    a content based read cache (CBRC); and
    one or more processors configured to cause the system perform operations for checking blocks in a virtual disk, the operations comprising:
        upon a write of a first block to the virtual disk, the virtual disk containing a plurality of blocks, updating data of the first block in the CBRC and data of the first block on the virtual disk;
        after updating the data of the first block on the virtual disk, updating a bitmap by setting a first bit corresponding to the first block in the bitmap, wherein the bitmap contains a bit for each block of the virtual disk, wherein updating the CBRC, updating the virtual disk, and updating the bitmap are performed by a first thread;
        after updating the bitmap, computing a first hash of the first block;
        storing the first hash to a digest file stored on the virtual disk;
        resetting the first bit after the first hash is stored to the digest file; and
        for any bit that is not set in the bitmap:

computing a hash of a block of the virtual disk corresponding to the bit that is not set;

comparing the computed hash to a stored hash for the block, the stored hash stored in the digest file; and if the computed hash and the stored hash are not equal, reporting an error, wherein comparing the computed hash to the stored hash and reporting the error are performed by a second thread.

14. The system of claim 13, wherein computing the first hash of the first block, storing the first hash to the digest file, and resetting the first bit are performed by a third thread that runs concurrently with the second thread, the third thread running when a number of bits set in the bitmap exceeds a high limit number and continuing while the number of bits set in the bitmap is greater than a low limit number.

15. The system of claim 13, wherein the second thread runs concurrently with the first thread, the second thread running when a number of bits set in the bitmap is less than a low limit number and continuing while the number of bits set in the bitmap is less than a high limit number.

* * * * *